United States Patent
Tomas et al.

(10) Patent No.: US 9,797,279 B2
(45) Date of Patent: Oct. 24, 2017

(54) EXHAUST VALVE AND AN ENGINE ASSEMBLY INCLUDING THE EXHAUST VALVE HAVING A PRESSURE RELIEF APPARATUS

(71) Applicant: GM GLOBAL TECHNOLOGY OPERATIONS LLC, Detroit, MI (US)

(72) Inventors: Terry A. Tomas, Clarkston, MI (US); Kenneth L. Briscoe, Commerce, MI (US); Robert S. McAlpine, Lake Orion, MI (US)

(73) Assignee: Gm Global Technology Operations LLC, Detroit, MI (US)

( * ) Notice: Subject to any disclaimer, the term of this patent is extended or adjusted under 35 U.S.C. 154(b) by 119 days.

(21) Appl. No.: 14/788,947

(22) Filed: Jul. 1, 2015

(65) Prior Publication Data
US 2016/0265396 A1 Sep. 15, 2016

Related U.S. Application Data

(60) Provisional application No. 62/121,880, filed on Feb. 27, 2015.

(51) Int. Cl.
*F01L 3/20* (2006.01)
*F16K 17/02* (2006.01)
(Continued)

(52) U.S. Cl.
CPC .......... *F01L 3/20* (2013.01); *F01L 1/053* (2013.01); *F16K 17/02* (2013.01); *F01L 1/185* (2013.01);
(Continued)

(58) Field of Classification Search
CPC ... F01L 3/20; F01L 1/053; F01L 1/185; F01L 1/2405; F01L 2001/0537; F01L 2101/02;
(Continued)

(56) References Cited

U.S. PATENT DOCUMENTS

| | | | | |
|---|---|---|---|---|
| 3,559,688 A | * | 2/1971 | Fischer | B60G 17/052 137/627.5 |
| 3,742,926 A | * | 7/1973 | Kemp | F02M 59/462 123/467 |
| 4,577,606 A | * | 3/1986 | Bohringer | F02M 59/462 123/467 |
| 5,357,914 A | * | 10/1994 | Huff | F01L 1/285 123/188.2 |

(Continued)

OTHER PUBLICATIONS

Article entitled "Internal combustion engine" from Wikipedia, the free encyclopedia website https://en.wikipedia.org/wiki/Internal_combustion_engine; retrieved on Feb. 25, 2015; 24 pages.

*Primary Examiner* — Joseph Dallo
*Assistant Examiner* — Yi-Kai Wang
(74) *Attorney, Agent, or Firm* — Quinn IP Law

(57) ABSTRACT

An exhaust valve includes a stem extending to a valve end. The valve end includes a pressure relief apparatus. An engine assembly includes a casing defining a cylinder bore, a combustion chamber and an exhaust passage. The combustion chamber is disposed between the exhaust passage and the cylinder bore. The engine assembly also includes a piston movable in the cylinder bore. The engine assembly further includes an exhaust valve movable between a first position blocking fluid communication through the exhaust passage and a second position allowing fluid communication through the exhaust passage. The exhaust valve includes a pressure relief apparatus configured to allow fluid communication through the exhaust valve from the cylinder bore to the exhaust passage when the exhaust valve is in the first position and a predetermined pressure threshold occurs in the cylinder bore between the exhaust valve and the piston.

19 Claims, 2 Drawing Sheets

(51) Int. Cl.
  *F01L 1/053* (2006.01)
  *F01L 1/18* (2006.01)
  *F01L 1/24* (2006.01)
  *F01L 3/02* (2006.01)

(52) U.S. Cl.
  CPC .............. *F01L 1/2405* (2013.01); *F01L 3/02* (2013.01); *F01L 2001/0537* (2013.01); *F01L 2101/02* (2013.01); *F01L 2103/01* (2013.01); *F01L 2105/00* (2013.01); *F01L 2820/01* (2013.01)

(58) Field of Classification Search
  CPC .............. F01L 2103/01; F01L 2105/00; F01L 2820/01; F16K 17/02
  USPC ...................................... 123/188.2
  See application file for complete search history.

(56) References Cited

U.S. PATENT DOCUMENTS

| | | | | |
|---|---|---|---|---|
| 5,806,403 | A * | 9/1998 | Johnston | F01L 3/20 91/224 |
| 5,848,608 | A * | 12/1998 | Ishigaki | F16K 31/1225 137/599.16 |
| 6,009,843 | A * | 1/2000 | Griffin | F01L 3/02 123/188.3 |
| 6,729,351 | B2 * | 5/2004 | Bircann | F16K 1/443 123/568.2 |
| 2011/0220062 | A1 * | 9/2011 | Sailer | F01L 1/053 123/321 |
| 2016/0053641 | A1 * | 2/2016 | Tsuneishi | F01L 3/20 123/41.16 |

* cited by examiner

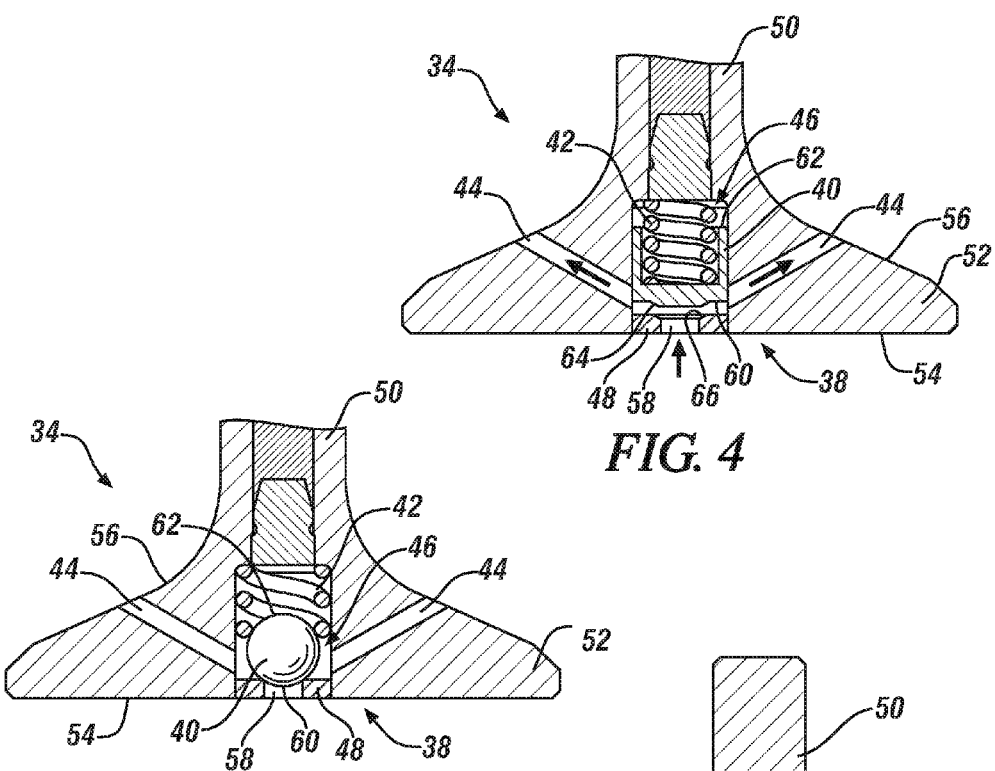
FIG. 4
FIG. 5
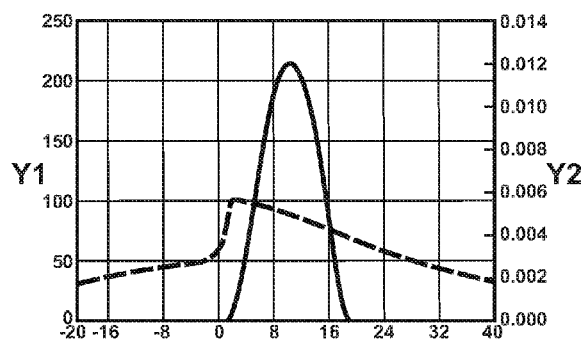
FIG. 6
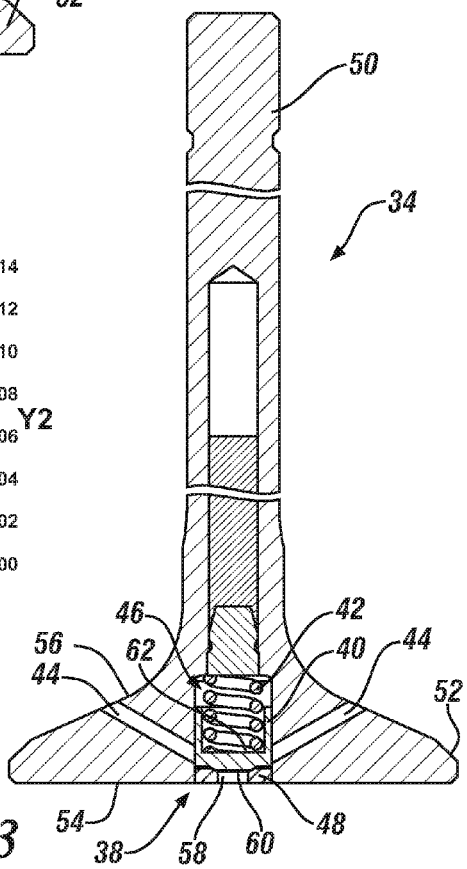
FIG. 3

EXHAUST VALVE AND AN ENGINE ASSEMBLY INCLUDING THE EXHAUST VALVE HAVING A PRESSURE RELIEF APPARATUS

CROSS-REFERENCE TO RELATED APPLICATIONS

This application claims the benefit of U.S. Provisional Application No. 62/121,880, filed on Feb. 27, 2015, which is hereby incorporated by reference in its entirety.

TECHNICAL FIELD

The present disclosure relates to an exhaust valve and an engine assembly including the exhaust valve having a pressure relief apparatus.

BACKGROUND

During engine operation, a pre-ignition event can occur in the engine, in which ignition occurs before the spark from a spark plug. The pre-ignition event can cause a spike in pressure between a closed exhaust valve and a piston moving toward a top-dead-center position. When this spike occurs, additional forces are applied to one or more of the exhaust valve, the connecting rods attached to the crankshaft, the piston and associated piston rings.

SUMMARY

The present disclosure provides an engine assembly including a casing defining a cylinder bore, a combustion chamber and an exhaust passage. The combustion chamber is disposed between the exhaust passage and the cylinder bore. The engine assembly also includes a piston movably disposed in the cylinder bore. The engine assembly further includes an exhaust valve movable between a first position blocking fluid communication through the exhaust passage and a second position allowing fluid communication through the exhaust passage. The exhaust valve includes a pressure relief apparatus configured to allow fluid communication through the exhaust valve from the combustion chamber to the exhaust passage when the exhaust valve is in the first position and a predetermined pressure threshold occurs in the combustion chamber between the exhaust valve and the piston.

The present disclosure also provides an exhaust valve including a stem extending to a valve end. The valve end includes a first side and a second side spaced from the first side. The valve end includes a pressure relief apparatus configured to allow fluid communication through the first and second sides when a predetermined pressure threshold occurs from the first side of the valve end.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 3 is a schematic fragmentary cross-sectional view of the exhaust valve including a pressure relief apparatus of a first configuration, with a blocking member in a closed position.

FIG. 4 is a schematic fragmentary cross-sectional view of the exhaust valve including the pressure relief apparatus, with the blocking member in an open position.

FIG. 5 is a schematic fragmentary cross-sectional view of the exhaust valve including a blocking member of a second configuration in the closed position.

FIG. 6 is a schematic chart of pressure verses a crank angle, and a mass flow rate verses the crank angle.

DETAILED DESCRIPTION

Figures 1, 2:
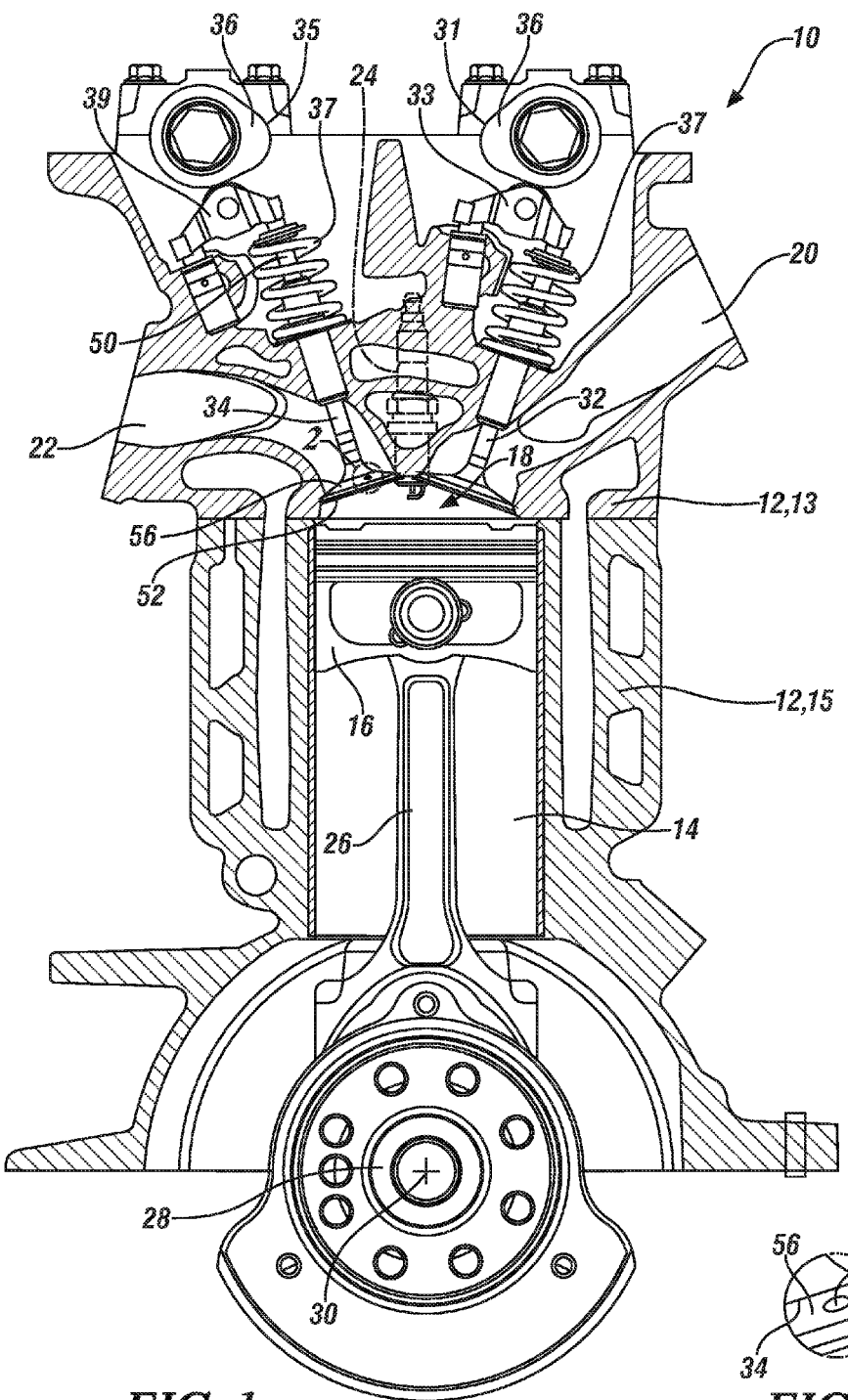
FIG. 1 is a schematic cross-sectional view of an engine assembly, with a piston in a top-dead-center position.
FIG. 2 is an enlarged perspective view of a passageway defined by an exhaust valve which is taken from circled area 2 in FIG. 1.

Those having ordinary skill in the art will recognize that directional references such as "above", "below", "upward", "up", "downward", "down", "top", "bottom", "left", "right", "back", "forth", etc., are used descriptively for the figures to aid the reader's understanding of the present disclosure, and do not create limitations, particularly as to the position, orientation, use of the disclosure or scope as defined by the appended claims. Furthermore, the term "substantially" can refer to a slight imprecision or slight variance of a condition, quantity, value, or dimension, etc., some of which that are within manufacturing variance or tolerance ranges.

Referring to the Figures, wherein like numerals indicate like or corresponding parts throughout the several views, an engine, such as an internal combustion engine, is generally shown in FIG. 1. The engine includes a plurality of components and will be referred to as an engine assembly 10 in the below discussion.

Referring to FIG. 1, the engine assembly 10 can generally include a casing 12, an oil pan, etc. The casing 12 can include a plurality of segments attached to each other to support various components. For example, the casing 12 can include a cylinder head 13 and an engine block 15 attached to each other.

The casing 12 defines a cylinder bore 14 and includes a piston 16 movably disposed in the cylinder bore 14. In certain embodiments, the casing 12 can define a plurality of cylinder bores 14 spaced from each other with a respective piston 16 disposed in respective cylinder bores 14. Therefore, the pistons 16 can reciprocate in respective cylinder bores 14. Generally, the pistons 16 translate back and forth in respective cylinder bores 14. In certain embodiments, the engine block 15 defines the cylinder bores 14. In other embodiments, the cylinder head 13 and the engine block 15 can cooperate to define the cylinder bores 14. The pistons 16 can move in respective cylinder bores 14 of the engine block 15, and in certain embodiments, into respective cylinder bores 14 of the cylinder head 13.

The cylinder bores 14 can be arranged in any suitable manner, such as, without limitation, a V-engine arrangement, an inline engine arrangement, and a horizontally opposed engine arrangement, as well as using both overhead cam and cam-in-block configurations.

Continuing with FIG. 1, the casing 12 can define a combustion chamber 18 for each respective cylinder bore 14. Therefore, if more than one cylinder bore 14 is being utilized, there will correspondingly be one combustion chamber 18 for each cylinder bore 14. In certain embodiments, the engine block 15 and the cylinder head 13 each define part of the combustion chamber 18 for each respective cylinder bore 14. Additionally, the casing 12 can define one or more intake passages 20 and one or more exhaust passages 22 each disposed adjacent to respective cylinder bores 14. The combustion chamber 18 is disposed between the exhaust passage(s) 22 and the cylinder bore 14. If more than one cylinder bore 14 is being utilized, each combustion chamber 18 is disposed between respective exhaust passage (s) 22 and respective cylinder bores 14. In certain embodiments, the combustion chamber 18, the intake passages 20 and the exhaust passages 22 can be formed, in part or in whole, by the cylinder head 13 of the casing 12. The intake passages 20 and the exhaust passages 22 are in selective fluid communication with each combustion chamber 18. Each intake passage 20 can deliver an air/fuel mixture to a respective combustion chamber 18 from an intake manifold. Following combustion of the air/fuel mixture, which can occur when ignited by a spark from a spark plug 24, the exhaust passage 22 carries exhaust gases out of the combustion chamber 18.

The piston 16 is coupled to a crankshaft 28. For example, a connecting rod 26 can couple the piston 16 to the crankshaft 28. The crankshaft 28 is rotatable about a pivot axis 30. Therefore, each piston 16 is coupled to the crankshaft 28 by respective connecting rods 26. The reciprocal motion of the pistons 16 is caused by combustion in the combustion chamber 18. Combustion of the air/fuel mixture applies a force to the pistons 16 which causes the pistons 16 to move in the respective cylinder bore 14 which causes the connecting rod 26 to rotate the crankshaft 28 such that the crankshaft 28 outputs a torque.

Generally, the piston 16 is movable in the cylinder bore 14. Therefore, each of the pistons 16 is movable in respective cylinder bores 14 between a top-dead-center position (which is shown in FIG. 1) and a bottom-dead-center position. The top-dead center position is when the piston 16 is at its highest point in the cylinder bore 14. Said differently, the top-dead-center position is when the piston 16 is at the maximum distance away from the pivot axis 30. Furthermore, when the piston 16 in the top-dead-center position, the crankshaft 28 is at a crank angle of about zero degrees. Therefore, before the piston 16 reaches the top-dead-center position, the crankshaft 28 is at the crank angle of less than zero degrees. The bottom-dead-center position is when the piston 16 is at its lowest point in the cylinder bore 14. Said differently, the bottom-dead-center position is when the piston 16 is at the minimum distance away from the pivot axis 30.

The engine assembly 10 can also include one or more intake valves 32 and one or more exhaust valves 34 cooperating with respective cylinder bores 14. Specifically, each of the cylinder bores 14 can have one or more intake valves 32 cooperating therewith and can have one or more exhaust valves 34 cooperating therewith. For example, each cylinder bore 14 can have two exhaust valves 34 and two intake valves 32 cooperating therewith. One or more rotating camshafts 36 can be operatively coupled to each of the intake valves 32 and the exhaust valves 34 to move one or more of the valves 32, 34 in one direction, and a return spring 37 can be operatively coupled to respective intake valves 32 and the exhaust valves 34 to move the valves 32, 34 in another direction. Generally, the valves 32, 34 translate back and forth, and therefore, rotation of respective camshafts 36 correspondingly causes translation of respective intake and exhaust valves 32, 34 in one direction while the return springs 37 move the respective valves 32, 34 in the opposite direction back to the valves 32, 34 original position. In certain embodiments, the intake and exhaust valves 32, 34 are supported by the cylinder head 13 of the casing 12.

The intake valves 32 are movable between a first position blocking fluid communication through the intake passage 20 and a second position allowing fluid communication through the intake passage 20. Therefore, the intake valves 32 control when the air/fuel mixture can enter the combustion chamber 18. For illustrative purposes only, FIG. 1 illustrates the intake valve 32 in the first position blocking the intake passage 20. When an eccentric portion 31 of the camshaft 36 that cooperates with the intake valve 32 rotates to a certain position, the eccentric portion 31 moves a rocker 33, and the rocker 33 moves the intake valve 32 to the second position. Once the eccentric portion 31 moves past the rocker 33, the return spring 37 moves the intake valve 32 back to the first position. The rocker 33 can be a roller-finger follower as illustrated in FIG. 1, a rocker arm that cooperates with a push rod or any other type of rocker that can move the intake valve 32 as desired. Alternatively, other types of actuators or actuator systems can be utilized with the camshaft 36 to move the intake valves 32.

The exhaust valves 34 are movable between a first position blocking fluid communication through the exhaust passage 22 and a second position allowing fluid communication through the exhaust passage 22. Therefore, the exhaust valves 34 control when the exhaust gases can exit the combustion chamber 18. For illustrative purposes only, FIG. 1 illustrates the exhaust valve 34 in the first position blocking the exhaust passage 22. When an eccentric portion 35 of the camshaft 36 that cooperates with the exhaust valve 34 rotates to a certain position, the eccentric portion 35 moves a rocker 39, and the rocker 39 moves the exhaust valve 34 to the second position. Once the eccentric portion 35 moves past the rocker 39, the return spring 37 moves the exhaust valve 34 back to the first position. The rocker 39 can be a roller-finger follower as illustrated in FIG. 1, a rocker arm that cooperates with a push rod or any other type of rocker that can move the exhaust valve 34 as desired. Alternatively, other types of actuators or actuator systems can be utilized with the camshaft 36 to move the exhaust valves 34.

Generally, as the piston 16 moves between the top-dead-center position and the bottom-dead-center position, the piston 16 creates an intake stroke and the intake valve 32 is correspondingly in the second position to allow the air/fuel mixture to enter the combustion chamber 18. Furthermore, as the piston 16 moves between the bottom-dead-center position and the top-dead-center position, the piston 16 creates an exhaust stroke and the exhaust valve 34 is correspondingly in the second position to allow the exhaust gases to exit the combustion chamber 18.

Referring to FIGS. 2-5, the exhaust valve 34 includes a pressure relief apparatus 38 configured to allow fluid communication through the exhaust valve 34 from the combustion chamber 18 to the exhaust passage 22 when the exhaust valve 34 is in the first position and a predetermined pressure threshold occurs in the combustion chamber 18 between the exhaust valve 34 and the piston 16. The piston 16 can be in any position inside the cylinder bore 14 when the predetermined pressure threshold is reached in the combustion chamber 18, and as one example, which is discussed further below, the position can be before the piston 16 reaches the top-dead-center position. Said differently, when the exhaust valve 34 is blocking the exhaust passage 22 and the predetermined pressure threshold occurs in the combustion chamber 18, the pressure relief apparatus 38 allows fluid communication from the combustion chamber 18 through the exhaust passage 22. Therefore, for example, the predetermined pressure threshold can occur in the combustion chamber 18 between the exhaust valve 34 and the piston 16 before the piston 16 reaches the top-dead-center position when the exhaust valve 34 is in the first position. The pressure relief apparatus 38 allows a reduction in the amount of pressure in the combustion chamber 18 in certain situations. For example, if a pre-ignition event occurs in the combustion chamber 18, a spike in pressure occurs in the combustion chamber 18 and if this spike in pressure meets a predetermined threshold, the pressure relief apparatus 38 will bleed or vent off the excess pressure, i.e., bleed or vent off gases.

The pre-ignition event can be various situations, and examples are discussed below. The pre-ignition event can be ignition of the air/fuel mixture in the combustion chamber 18 before the spark from the spark plug 24 occurs. Simply stated, combustion occurs in the combustion chamber 18 due to something other than the spark from the spark plug 24. Furthermore, the pre-ignition event can be when the spark from the spark plug 24 occurs at a different timing than desired. Generally, the pre-ignition event can include abnormal combustion phenomena, which can be referred to as stochastic pre-ignition or mega knock.

As one example of the pre-ignition event, the event can occur as the piston 16 is moving toward the top-dead-center position but has not reached that position yet. In other words, the pre-ignition event can occur before the piston 16 reaches the top-dead-center position. As such, combustion applies a force to the top of the piston 16 which forces the piston 16 down, but the piston 16 is still moving up toward the top-dead-center position so a spike in pressure occurs in the combustion chamber 18 which the pressure relief apparatus 38 relieves. Furthermore, the pressure relief apparatus 38 can relieve the increase in pressure applied to the exhaust valve 34 as the piston 16 is still moving up toward the top-dead center position when the pre-ignition event occurs. As shown in FIG. 6, a pressure Y1 spike begins to occur before the crankshaft 28 reaches the zero degree crank angle X, but the pressure relief apparatus 38 counters this spike by relieving pressure (see the dashed line illustrated which begins to move upwardly before the crank angle X is at zero degrees, i.e., at about negative two degrees to about negative one degree, and then steadily slopes downwardly from about two degrees of the crank angle X). As indicated above, for the graph of FIG. 6, the pressure Y1 is in units of bar and the crank angle X is in units of degree. FIG. 6 also illustrates a mass flow rate Y2 (in units of kilogram/second) when the pressure relief apparatus 38 counters the pressure spike (the solid line illustrated for the mass flow rate Y2 spikes at about 0.012 kilogram/second at about the ten degree crank angle X).

The pressure relief apparatus 38 can limit a maximum amount of pressure in the combustion chamber 18 and correspondingly limit the load(s) applied to various components of the engine in light of the maximum pressure in the combustion chamber 18. Therefore, the pressure relief apparatus 38 can provide a cost and mass savings of the components as the components will not have to be designed to withstand extreme pressure spikes.

Generally, the exhaust valve 34 supports the pressure relief apparatus 38. As such, the pressure relief apparatus 38 is incorporated in the exhaust valve 34, as discussed in detail below and as illustrated in FIGS. 2-5.

Referring to FIGS. 3-5, generally, the pressure relief apparatus 38 can include a blocking member 40 and a biasing member 42 continuously biasing the blocking member 40 to a closed position. The blocking member 40 is movable to an open position when the predetermined pressure threshold occurs which allows fluid communication through the exhaust valve 34. FIGS. 3 and 5 illustrate the blocking member 40 in the closed position and FIG. 4 illustrates the blocking member 40 in the open position.

Therefore, the blocking member 40 is normally in the closed position to prevent fluid communication through the exhaust valve 34 when the pre-ignition event has not occurred. As such, under normal operation of the exhaust valve 34, the blocking member 40 is normally in the closed position. When the pre-ignition event occurs such that the predetermined pressure threshold is reached, the blocking member 40 moves to the open position because the predetermined pressure applied to the blocking member 40 overcomes the force applied to the blocking member 40 by the biasing member 42, and thus, allows the exhaust gases to exit through the exhaust valve 34 out through the exhaust passage 22 to relieve excess pressure in the combustion chamber 18.

As best shown in FIGS. 3-5, the pressure relief apparatus 38 can also include a passageway 44 defined by the exhaust valve 34. The passageway 44 allows fluid communication between the combustion chamber 18 and the exhaust passage 22 when the blocking member 40 is in the open position. Specifically, when the blocking member 40 is in the open position, fluid communication is allowed between the combustion chamber 18 and the exhaust passage 22 through the passageway 44 of the exhaust valve 34.

In certain embodiments, the passageway 44 is further defined as a plurality of passageways 44 spaced from each other. Therefore, each of the passageways 44 allows fluid communication between the combustion chamber 18 and the exhaust passage 22 when the blocking member 40 is in the open position. As such, when the predetermined pressure threshold is reached in the combustion chamber 18, when the exhaust valve 34 is in the first position blocking the exhaust passage 22, exhaust gases can be bled or vented from the combustion chamber 18 through the passageways 44 and out the exhaust passages 22.

Continuing with FIGS. 3-5, the pressure relief apparatus 38 includes a recess 46 defined by the exhaust valve 34, with the recess 46 and the passageway 44 being in fluid communication. The recess 46 and the passageway 44 cooperate, or adjoin each other, to selectively allow fluid communication through the exhaust valve 34. Therefore, for example, the passageway 44 and the recess 46 are juxtaposed next to each other such that the recess 46 and the passageway 44 are in fluid communication. The blocking member 40 and the biasing member 42 are disposed in the recess 46. Therefore, when the blocking member 40 is in the open position, fluid communication is allowed through the recess 46 and the passageway 44 out to the exhaust passage 22.

The pressure relief apparatus 38 can also include a stop 48 disposed in the recess 46. The biasing member 42 continuously biases the blocking member 40 into engagement with the stop 48. Therefore, as shown in FIGS. 3 and 5, the blocking member 40 engages the stop 48 when in the closed position to prevent fluid communication through the passageway 44 into the exhaust passage 22. As shown in FIG. 4, the blocking member 40 is spaced from the stop 48 when in the open position to allow fluid communication through the passageway 44 into the exhaust passage 22. Arrows have been added to FIG. 4 to generally illustrate the flow of fluid, such as gases, through the exhaust valve 34 when the blocking member 40 is in the open position.

Continuing with FIGS. 3-5, the exhaust valve 34 can include a stem 50 and a valve end 52. The stem 50 can extend to the valve end 52. In certain embodiments, the valve end 52 can be enlarged as compared to the stem 50. Furthermore, the valve end 52 selectively blocks the exhaust passage 22. The valve end 52 can also include a first side 54 facing the combustion chamber 18. Additionally, the first side 54 faces away from the exhaust passage 22. The recess 46 is defined through the first side 54 of the valve end 52.

Generally, the first side 54 defines the recess 46. Therefore, the recess 46 extends away from the first side and is open adjacent to the first side. In certain embodiments, the stop 48 is disposed adjacent to the first side 54 and the blocking member 40 selectively prevents fluid communication through the first side 54 of the exhaust valve 34. The stop 48 defines an opening 58 that the blocking member 40 selectively covers. The opening 58 is selectively in fluid communication with the recess 46. When the blocking member 40 engages the stop 48, when in the closed position, fluid communication through the opening 58 is prevented. When the blocking member 40 is spaced from the stop 48, when in the open position, fluid can flow through the opening 58 into the recess 46 and out the passageways 44.

The valve end 52 can further include a second side 56 spaced from the first side 54. The second side 56 faces the exhaust passage 22, and thus faces away from the combustion chamber 18. The valve end 52 can include the pressure relief apparatus 38 configured to allow fluid communication through the first and second sides 54, 56 when the predetermined pressure threshold occurs from the first side 54 of the valve end 52. The passageway 44 is defined through the second side 56, but not the first side 54, while the recess 46 is defined through the first side 54, but not the second side 56. As discussed above, the recess 46 and the passageway 44 are in fluid communication with each other. As shown in FIG. 3, the blocking member 40 engages the stop 48 when in the closed position to prevent fluid communication through the passageway 44 and out the second side 56. As shown in FIG. 4, the blocking member 40 is spaced from the stop 48 when in the open position to allow fluid communication through the passageway 44 and out the second side 56. Therefore, when exhaust gases are bled or vented through the exhaust valve 34 when the blocking member 40 is in the open position, the gases flow from the combustion chamber 18 through the recess 46 and the passageway(s) 44 into the exhaust passage 22.

The passageways 44 can be any suitable direction, location, angle and configuration, and FIGS. 3-5 illustrate one non-limiting example. FIGS. 3-5 illustrate the passageways 44 extending transverse to the second side 56. The entrance of the passageways 44 can be disposed proximal to the stop 48 adjacent to the recess 46 and can extend angularly toward the second side 56. By locating the entrance of the passageways 44 proximal to a front side 60 of the blocking member 40, the amount of gases that reach the biasing member 42 and a back side 62 of the blocking member 40 are minimized because the gases do not have to pass those components before reaching the passageways 44. Alternatively, the passageways 44 can extend from the recess 46 substantially parallel relative to the first side 54.

The blocking member 40 is movable to the open position when the predetermined pressure threshold occurs which allows fluid communication through the first and second sides 54, 56 (of the valve end 52). The passageway(s) 44 are defined through the second side 56 of the valve end 52 and the passageway(s) 44 allow fluid communication between the first and second sides 54, 56 when the blocking member 40 is in the open position. The blocking member 40 can be any suitable configuration, and non-limiting examples are shown in FIGS. 3-5. In certain embodiments, as shown in FIGS. 3 and 4, the blocking member 40 is a cup. The portion of the cup that generally faces the stop 48 can be flat, tapered, arcuate, curved, stepped or any other suitable configuration, or any combination thereof. In other embodiments, as shown in FIG. 5, the blocking member 40 is a ball.

The cup of FIGS. 3 and 4 illustrate the front side 60 including a step 64 and the step 64 selectively engages the stop 48. Optionally, the stop 48 can include a tapered surface 66 disposed adjacent to the opening 58. Generally, the step 64 engages the tapered surface 66 when the blocking member 40 is in the closed position which prevents fluid communication through the opening 58.

The blocking member 40 can be formed of any suitable material. For example, the blocking member 40 can be formed of a metal material, and one non-limiting specific example is steel. As another example, the blocking member 40 can be formed of a ceramic material.

Furthermore, optionally, the blocking member 40 can be coated with any suitable material. For example, the blocking member 40 can be coated with a ceramic material.

In various embodiments, the biasing member 42 is a coil spring. The biasing member 42 can be other configurations, such as a leaf spring, etc., or any other suitable biasing feature. The biasing member 42 can be tuned to the desired spring rate that allows the blocking member 40 to move to the open position when the predetermined pressure threshold is reached. Therefore, the spring rate of the biasing member 42 can be adjusted depending on the desired amount of pressure build up that is to occur in the combustion chamber 18 before the pressure relief apparatus 38 is to operate.

The pressure relief apparatus 38 can be incorporated in one of the two exhaust valves 34 for each of the cylinder bores 14. Alternatively, the pressure relief apparatus 38 can be incorporated in both of the exhaust valves 34 of each of the cylinder bores 14. It is to be appreciated that any suitable number of pressure relief apparatuses 38 can be utilized in the desired engine configuration.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An engine assembly comprising:
    a casing defining a cylinder bore, a combustion chamber and an exhaust passage, with the combustion chamber disposed between the exhaust passage and the cylinder bore;
    a piston movably disposed in the cylinder bore;
    an exhaust valve movable between a first position blocking fluid communication through the exhaust passage and a second position allowing fluid communication through the exhaust passage; and wherein:
the exhaust valve includes a pressure relief apparatus configured to allow fluid communication through the exhaust valve from the combustion chamber to the exhaust passage when the exhaust valve is in the first position and a predetermined pressure threshold occurs in the combustion chamber between the exhaust valve and the piston;
the pressure relief apparatus includes a blocking member and a biasing member continuously biasing the blocking member to a closed position, with the blocking member movable to an open position when the predetermined pressure threshold occurs which allows fluid communication through the exhaust valve;
the exhaust valve includes a stem and a valve end, with the valve end selectively blocking the exhaust passage;
the blocking member is entirely contained inside the valve end when in the closed and open positions; and
the biasing member is entirely contained inside the valve end when the blocking member is in the closed and open positions.

2. The assembly as set forth in claim 1 wherein the pressure relief apparatus includes a passageway defined by the valve end of the exhaust valve, and the passageway allows fluid communication between the combustion chamber and the exhaust passage when the blocking member is in the open position.

3. The assembly as set forth in claim 2 wherein the passageway is further defined as a plurality of passageways spaced from each other, with each of the passageways allowing fluid communication between the combustion chamber and the exhaust passage when the blocking member is in the open position.

4. The assembly as set forth in claim 2 wherein the pressure relief apparatus includes a recess defined by the valve end of the exhaust valve, with the recess and the passageway being in fluid communication, and with the blocking member and the biasing member disposed in the recess.

5. The assembly as set forth in claim 4 wherein the pressure relief apparatus includes a stop disposed in the recess, with the biasing member continuously biasing the blocking member into engagement with the stop, and wherein the blocking member engages the stop when in the closed position to prevent fluid communication through the passageway into the exhaust passage, and with the blocking member spaced from the stop when in the open position to allow fluid communication through the passageway into the exhaust passage.

6. The assembly as set forth in claim 5 wherein the stop defines an opening and the blocking member selectively covers the opening, and wherein the valve end includes a first side facing the combustion chamber, and the opening is disposed between the first side of the valve end and the passageway.

7. The assembly as set forth in claim 4 wherein the valve end includes a first side facing the combustion chamber and the recess is defined through the first side.

8. The assembly as set forth in claim 7 wherein the valve end includes a second side spaced from the first side, with the passageway defined through the second side and spaced from the first side, and with the recess spaced from the second side.

9. The assembly as set forth in claim 1 wherein the blocking member is a cup.

10. The assembly as set forth in claim 9 wherein the cup includes a front side, and the front side includes a step selectively engaging a stop.

11. The assembly as set forth in claim 1 wherein the blocking member is a ball.

12. The assembly as set forth in claim 1 wherein the biasing member is a coil spring.

13. The assembly as set forth in claim 1:
wherein the piston is movable in the cylinder bore between a top-dead-center position and a bottom-dead-center position;
wherein the piston is coupled to a crankshaft, and the crankshaft is rotatable about a pivot axis, and before the piston reaches the top-dead-center position, the crankshaft is at a crank angle of less than zero degrees; and
wherein the predetermined pressure threshold occurs in the combustion chamber between the exhaust valve and the piston before the piston reaches the top-dead-center position when the exhaust valve is in the first position.

14. An exhaust valve comprising:
a stem extending to a valve end, with the valve end including a first side and a second side spaced from the first side; and
wherein:
the valve end includes a pressure relief apparatus configured to allow fluid communication through the first and second sides when a predetermined pressure threshold occurs from the first side of the valve end;
the pressure relief apparatus includes a blocking member and a biasing member continuously biasing the blocking member to a closed position, and with the blocking member movable to an open position when the predetermined pressure threshold occurs which allows fluid communication through the first and second sides;
the valve end has an outer diameter and the stem has an outer diameter, with the outer diameter of the valve end being greater than the outer diameter of the stem;
the blocking member is contained inside the valve end when in the closed and open positions;
the pressure relief apparatus includes a recess defined through the first side of the valve end and spaced from the second side of the valve end;
the pressure relief apparatus includes a stop disposed in the recess; and
the stop includes an outer surface that is substantially flush with the first side of the valve end.

15. The valve as set forth in claim 14 wherein the pressure relief apparatus includes a passageway defined through the second side of the valve end and spaced from the first side of the valve end, and wherein the passageway allows fluid communication between the first and second sides when the blocking member is in the open position.

16. The valve as set forth in claim 15 wherein the passageway is further defined as a plurality of passageways spaced from each other, with each of the passageways allowing fluid communication between the first and second sides when the blocking member is in the open position.

17. The valve as set forth in claim 15 wherein the passageway and the recess are juxtaposed next to each other such that the recess and the passageway are in fluid communication, with the blocking member and the biasing member disposed in the recess.

18. The valve as set forth in claim 17 wherein the biasing member is continuously biasing the blocking member into engagement with the stop, and wherein the blocking member engages the stop when in the closed position to prevent fluid communication through the passageway and out the second side, and with the blocking member spaced from the stop when in the open position to allow fluid communication through the passageway and out the second side.

19. The valve as set forth in claim 14 wherein the blocking member and the biasing member are entirely contained inside the valve end when the blocking member is in the closed and open positions.

* * * * *